United States Patent [19]

Gomez

[11] Patent Number: 4,643,084
[45] Date of Patent: Feb. 17, 1987

[54] COOKIE MACHINE

[76] Inventor: Isaac Gomez, 8623 Bridle Path Ct., Davie, Fla. 33328

[21] Appl. No.: 853,042

[22] Filed: Apr. 17, 1986

[51] Int. Cl.[4] .......................... A47J 37/00; A21B 1/48
[52] U.S. Cl. ........................................ 99/352; 99/353; 99/443 C; 99/450.4; 83/588; 118/16; 118/24; 426/496; 426/512
[58] Field of Search ...................... 99/352, 353, 443 C, 99/450.4, 450.7, 494; 83/588; 118/24, 16; 426/496, 512, 523

[56] References Cited

U.S. PATENT DOCUMENTS 4,229,487 10/1980 Crothers ........................... 99/353 X
4,528,900 7/1985 Simelunas ........................... 99/450.7

FOREIGN PATENT DOCUMENTS 2206644 8/1972 Fed. Rep. of Germany ..... 99/450.4
2483180 12/1981 France ................................ 99/450.7

Primary Examiner—Billy J. Wilhite
Attorney, Agent, or Firm—Jesus Sanchelima

[57] ABSTRACT

A machine for making cookies for removably mounted cylinders that spread the dough on a conveyor belt and the dough is automatically formed into cookies. Mechanism for sprinkling material are positioned so that the particulate material falls on the surface where the dough is going to be deposited and on the cookies themselves. A trap for the excess of the particulate material is provided by routing the conveyor belt appropriately. This allows using that particulate material again.

9 Claims, 6 Drawing Figures

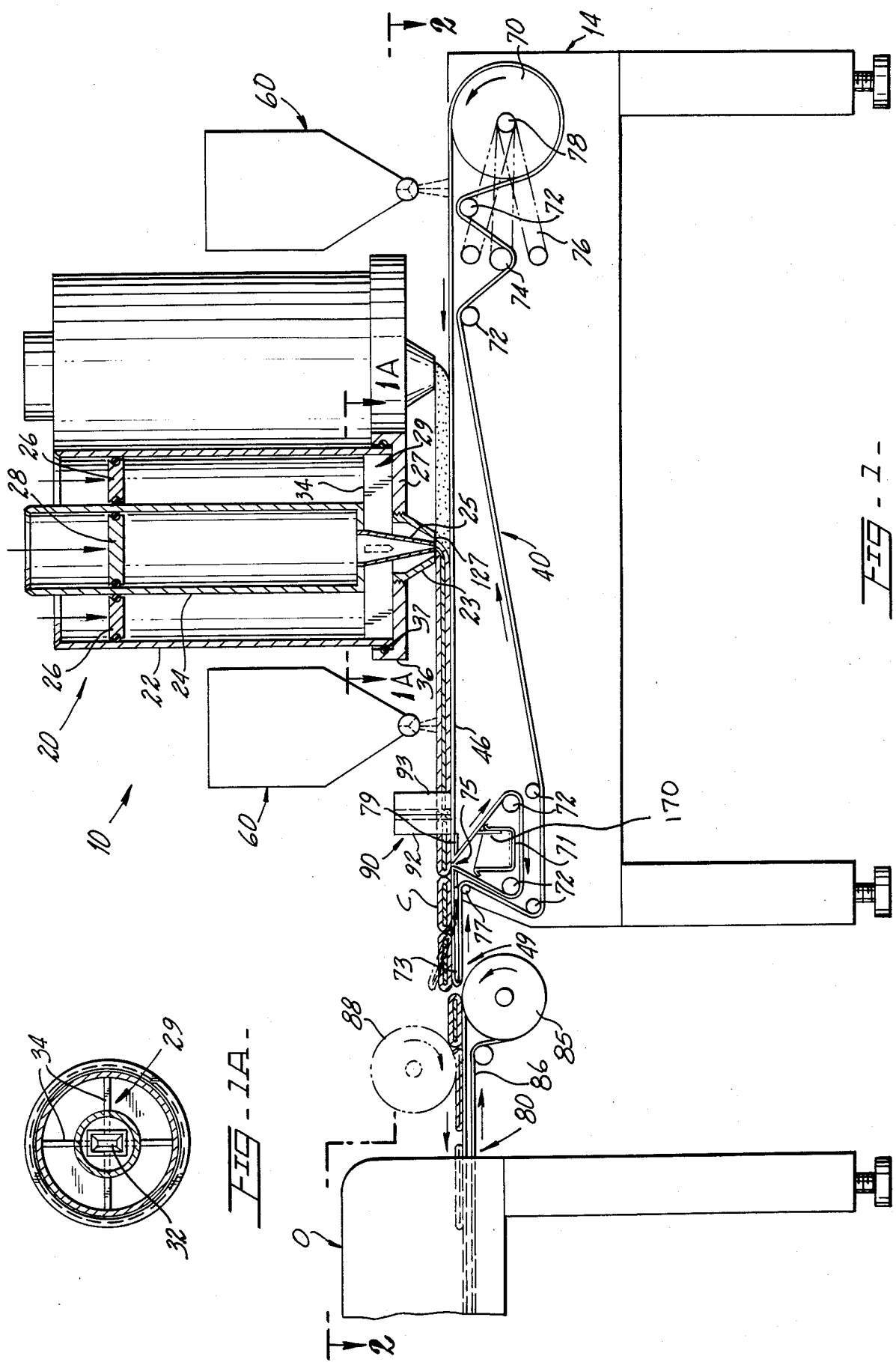

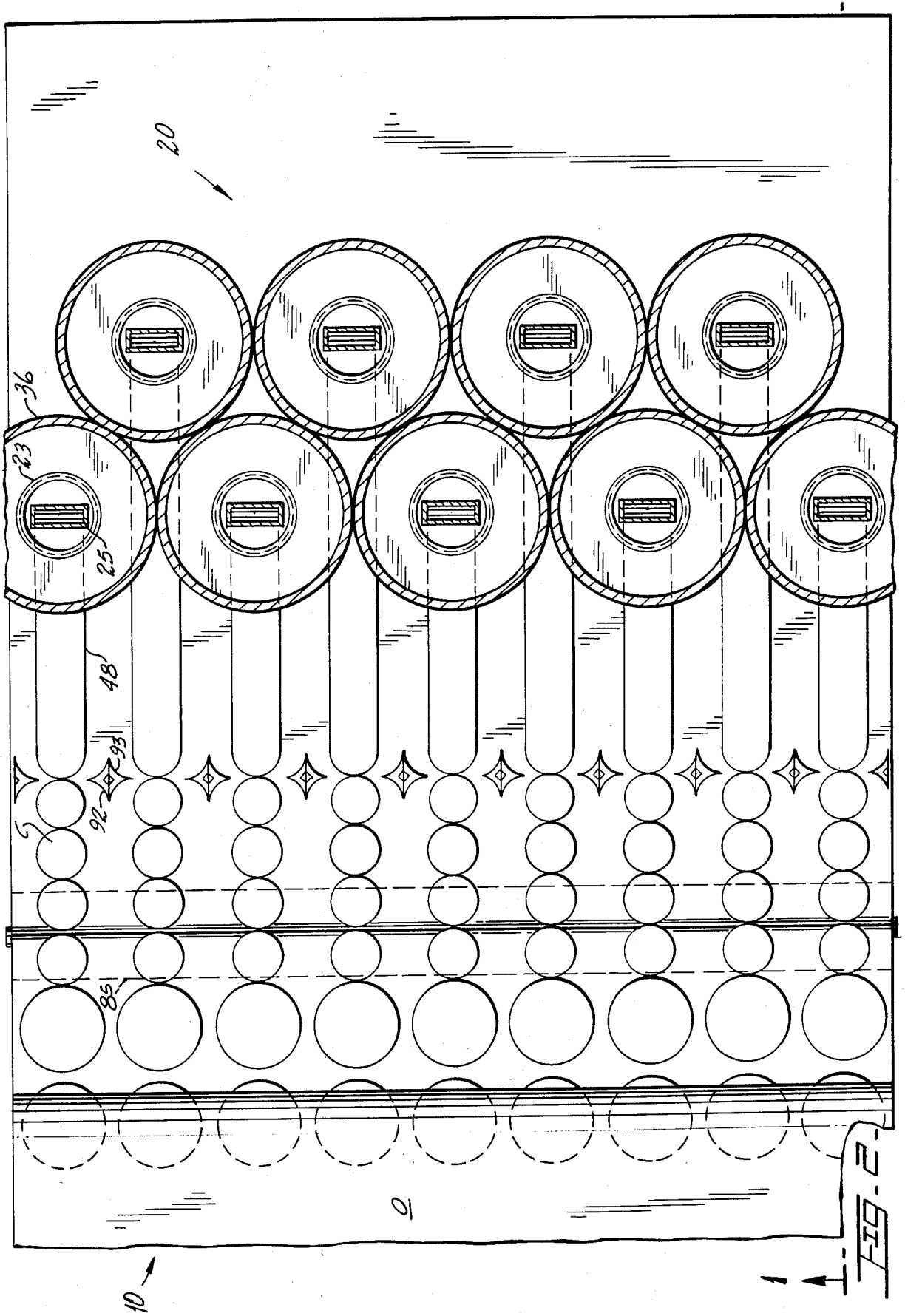

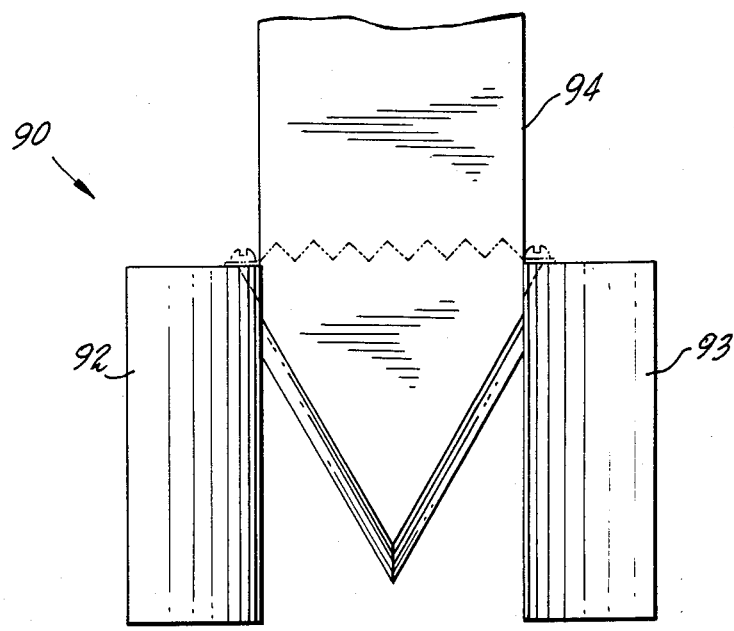
FIG-3-
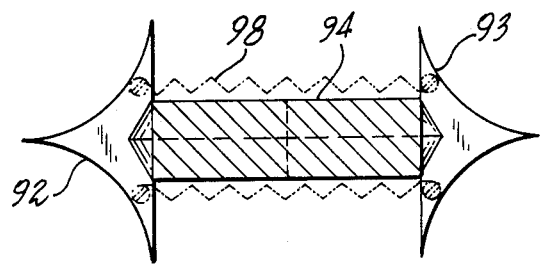
FIG-4-
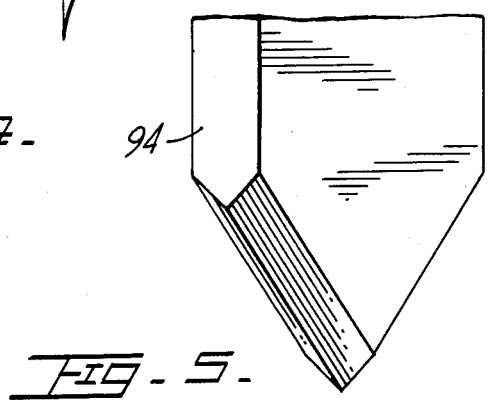
FIG-5-

COOKIE MACHINE

BACKGROUND OF THE INVENTION

1. Field of the Invention.

The present invention relates to a machine for making cookies, and more particularly, to such machine that is completely automated.

2. Description of the Related Art.

Several designs for forming cookies exist that in one way or another make the desired cookies from a given dough. However, if the flavor of the dough is to be modified, an involved procedure is usually necessary requiring cleaning and flushing the equipment before starting with the new dough. Here, a machine is provided where the dough can be easily changed for another type of dough or filling material. Also, several different kinds of cookies may be manufactured simultaneously, and with different proportions of dough and/or filling materials.

SUMMARY OF THE INVENTION

It is one of the main objects of the present invention to provide a machine for making cookies automatically where the dough or combination of doughs may be readily changed.

It is still another object of this invention to provide a machine for making cookies that is space efficient.

It is yet another object of the present invention to provide such a machine that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 is a side view of the present invention showing a cross-section of one of the dough dispensers.

FIG. 1a represents a top view of a cross section taken along line 1a—1a in FIG. 1.

FIG. 2 shows a top view of this invention showing the path followed by the cookies being formed and the relative position of the different elements of the present invention.

FIG. 3 illustrates the cookie forming and cutting mechanism utilized in the preferred embodiment.

FIG. 4 is a top view of the mechanism shown in FIG. 3.

FIG. 5 is a view in perspective of the cam actuator that moves the forming and cutting mechanism.

DETAILED DESCRIPTION OF THE PREFERRED EMBODIMENT

Referring now to FIG. 1, where the present invention is generally referred to with numeral 10, it can be seen that it basically comprises of fixed table member 14, dough dispensing means 20; conveyor system 40; sprinkling means 60, oven conveyor system 80 and forming and cutting means 90.

Dough dispensing means 20 have, in the preferred embodiment, cylindrical shape members 22 and 24 terminating in a spout with a rectangular cross-section opening. Dispensing means 20 are rigidly mounted with respect to table member 14. The partial cross-section of FIG. 1 shows two coaxially disposed cylindrical members 22 and 24 with piston heads 26 and 28. Piston head 28 has a circular shape and piston head 26 has an annular shape. Heads 26 and 28 are forced down with a predetermined force to cause a certain amount of dough to come out through the openings of spouts 23 and 25 and spread over conveyor belt 46 as shown in FIG. 2 as dough bar 48. As shown in FIG. 1, inside inner cylinder 24 one type of dough is contained and inside the compartment defined by the space created between inner cylinder 24 and the inner wall of outer cylinder 22, another type of dough is contained. For the purposes of this writing, dough is to be interpreted also as any filling or other edible substance that will form part of the cookies being formed. Inner and outer cylinders 24 and 22 are readily installed and may be exchanged quickly to change the type of cookie being made. Cylinder member 22 is removably mounted on circular base 27. Spout 23 is removably mounted to the underside of base 27 and allows the dough through opening 127 which preferably has an internal thread compatible with an external thread on the wider portion of spout member 23. Spout 25 rests on cross bar assembly 29 which includes a cooperating opening 32 that partially houses spout 25. Spout 25 is removably mounted to cross bar assembly 29 and protrudes downwardly enough so that the ends of spout members 23 and 25 are aligned in a horizontal plane. Cross bar assembly 29 rests on base 27 and its arms 34 extend outwardly a sufficient distance to leave a clearance between the end of arms 34 and the inner wall of flange 36 that extends upwardly from the periphery of circular base 27. Outer cylinder 22 fits in that clearance. O-rings 37 help in providing a snug fit of cylinder 22. Cylinder members 22 and 24 may be disposable or refillable. Cookies C are seen in FIG. 1 to have an outer dough with a filling as they come out of spouts 23 and 25.

Conveyor belt 46 follows the path shown in FIG. 1 aided by drum 70 rollers 72 and frictionally diverting bars 73 and 79. Roller 74 is rotatably mounted to arm members 76 (only one is shown in phantom and three possible positions) which in turn is pivotally mounted to a fixed point, preferably axle 78 of drum 70. The weight of roller member 74 provides some tension to belt 46. A trap 75 is provided to allow excess sprinklers' particles to fall in tray 71 which is removably mounted below. Tray 71 includes scrapper member 170 that scrapes off any particles on the upper surface of belt 46. Trap 75 includes an adjustable gap formed by the separation of frictionally diverting bars 79. The leftmost end 49 (or exit end) of conveyor belt 46 is hingedly mounted so that some upwardly movement is provided to allow the formed dough to flip over, if desired. This is accomplished if leftmost end bar 73 is sufficiently raised. Conveyor belt 46 is passed over the leftmost end 73 and brought down over roller member 77 and directed by other rollers 72.

A forming mechanism 90 includes knives 92 and 93 which have a substantially triangular form and are moved towards each other periodically to form the cookies from elongated dough bars 48, as shown in the figures. Caming member 94 is periodically moved down to separate knives 92 and 93, which are made out of a material that does not stick to the dough, preferably Teflon. Sets of knives 92 and 93 are arranged opposite to each other so that when caming members 94 are brought down, they make knives 92 and 93 of adjacent set come together. Spring member 98 is biased to urge knives 92 and 93 in a given set together.

The forces that cause caming members 94 and conveyor belt 46 to move are conventionally timed and adjusted so that cookies of different predetermined lengths are formed as bar 48 is moved on conveyor belt 46.

Sprinkling or duster means 60 are included before and after dispensing means 20 so that the commonly powdery substances sprinkled on the cookies may be deposited on conveyor belt 46 (to later come in contact with the underside of bar 48) and on the upperside of the bar 48.

Oven conveyor system 80 starts where conveyor system 40 ends. Drum 85 provides the rotational force that causes conveyor system 80 to move. A height adjustable flattening drum 88 flattens out cookies dough C to the desired thickness before entering oven O. The belt 86 of conveyor system 80 has a Teflon coating on its upper surface to avoid the use of grease to prevent sticking of the material to the surface.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. A machine for making cookies, comprising:
   A. a table member having an upper surface;
   B. conveyor means mounted to said table member having a conveyor belt that travels substantially on the upper surface of said table member;
   C. a plurality of base members mounted at a predetermined spaced apart relationship with respect to the upper surface of said table member and said base members having a through opening;
   D. a plurality of means for dispensing dough mounted on said base members and including removably mounted cylinder members containing said dough and said cylinder members having upper and lower ends and further including piston heads slidably engaged therein; and
   E. a plurality of spout members mounted to said through openings so that said dough is allowed through in response to the movement of said piston heads and said dough being deposited on said conveyor belt.

2. The machine set forth in claim 1 further including:
   F. means for sprinkling powder material on said conveyor belt and on said cookies.

3. The machine set forth in claim 2 wherein said conveyor means includes a trap section having frictionally diverting bars separated a predetermined distance so that a gap is defined along an upper path traveled by said conveyor belt.

4. The machine set forth in claim 3 further including:
   G. means for forming said cookies including knife members that move transversally over said conveyor belt thereby forming said cookies from the dough spread on said conveyor.

5. The machine set forth in claim 4 wherein said conveyor means includes a hingedly mounted section at its exit end and the angle of said section with respect to the horizontal plane of said conveyor belt may be adjusted so that said cookies being formed are flipped over when they exit said conveyor means.

6. The machine set forth in claim 5 further including:
   H. oven conveyor means adjacent to said conveyor means and said oven conveyor means includes a conveyor belt that has an upper surface that is coated with Teflon.

7. The machine set forth in claim 6 further including:
   I. tray means positioned below said trap section so that the excess powder material may be collected in said tray.

8. The machine set forth in claim 7 further including:
   J. flattening means mounted over said oven conveyor means.

9. The machine set forth in claim 8 wherein said tray means includes scrapper means so arranged and constructed that said scrapper means scrape any matter adhered to the upper surface of said conveyor means.

* * * * *